United States Patent [19]

Hartman et al.

[11] 4,171,413

[45] Oct. 16, 1979

[54] ACRYLIC HYDRAZIDES

[75] Inventors: Marvis E. Hartman, Pittsburgh; Rostyslaw Dowbenko; Thomas R. Hockswender, both of Gibsonia, all of Pa.

[73] Assignee: PPG Industries, Inc., Pittsburgh, Pa.

[21] Appl. No.: 821,686

[22] Filed: Aug. 4, 1977

Related U.S. Application Data

[63] Continuation-in-part of Ser. No. 636,485, Dec. 1, 1975, abandoned.

[51] Int. Cl.$^2$ .............................................. C08F 8/30
[52] U.S. Cl. ........................... 525/329; 260/29.6 H; 260/29.6 TA; 526/307; 525/328; 525/336; 525/376
[58] Field of Search ................. 526/15, 1 C, 307, 51, 526/23

[56] References Cited

U.S. PATENT DOCUMENTS

| 1,976,679 | 5/1931 | Fikentsher et al. | 8/6 |
| 2,914,510 | 11/1959 | Contois | 260/78 |
| 3,007,887 | 11/1961 | Essig | 260/29.6 |

FOREIGN PATENT DOCUMENTS 52-96466 2/1977 Japan .

Primary Examiner—Stanford M. Levin
Attorney, Agent, or Firm—William J. Uhl

[57] ABSTRACT

Non-gelled acrylic-hydrazide resins are prepared by reacting hydrazine with a non-gelled acrylic polymer containing a functional group reactive with hydrazine to cause hydrazide formation.

14 Claims, No Drawings

ACRYLIC HYDRAZIDES

CROSS-REFERENCE TO RELATED APPLICATIONS

This application is a continuation-in-part of U.S. application Ser. No. 636,485, filed Dec. 1, 1975, now abandoned.

BACKGROUND OF THE INVENTION

The present invention relates to acrylic-hydrazide resins, and more particularly to acrylic-hydrazide resins which are water-soluble or reducible. These resins are useful in formulating organic solvent-based or water-based coatings which are useful as protective and decorative coatings.

Monomeric hydrazides have been employed as curing or hardening agents for various polymers as shown in, for example, U.S. Pat. Nos. 2,847,395 to Wear, issued Aug. 12, 1958; 2,970,972 issued to Wear Feb. 7, 1961; 3,755,288 issued to Sheppard et al Aug. 28, 1973; and 3,876,606 issued to Kehr Apr. 8, 1975. A hydrazide modified ketone-aldehyde condensation polymer has also been employed in coatings as shown in U.S. Pat. No. 3,878,021 issued to Tiedeman Apr. 15, 1974. However, none of the above-mentioned patents, and for that matter, none of the art of which applicants are aware disclose or suggest solutions or dispersions of acrylic-hydrazide resins.

SUMMARY OF THE INVENTION

The present invention provides an acrylic polymer containing hydrazide groups comprising the reaction product of:

(A) an addition polymer formed by vinyl polymerization of 1 to 20 percent by weight of an alpha, beta-ethylenically unsaturated carboxylic acid and 80 to 99 percent by weight of at least one other vinyl monomer component which does not contain an epoxy, nitrile or N-methylol group, at least a portion of which contains a functional group which is reactive with hydrazine to form hydrazide groups; the percentage by weight being based on total weight of alpha, beta-ethylenically unsaturated carboxylic acid and other vinyl monomer component, said addition polymer having at least 25 percent of its acid groups neutralized with an organic or inorganic or inorganic base, said addition polymer being a solid in the absence of solvents, (B) 5 to 40 mole percent of hydrazine or an alkyl substituted hydrazine based on total moles of monomers used in preparing said addition polymer with the proviso that the moles of hydrazine or alkyl substituted hydrazine do not exceed the moles of monomers containing functional groups reactive with the hydrazine.

DETAILED DESCRIPTION

The hydrazide group containing addition polymer component of the polymeric compositions herein is the product formed by the reaction of hydrazine with an addition polymer formed by the vinyl addition polymerization of at least one monomer containing a polymerizable double bond and a functional group reactive with hydrazine but which does not contain an N-methylol group. Preferably, monomers which contain epoxy and nitrile groups should be avoided in preparing the preferably polymer since the presence of such groups in the polymer can lead to premature gelation of the hydrazide group containing addition polymer product.

Broadly speaking, suitable monomers of the above type which may be employed in forming the addition polymer herein are those containing both ethylenic unsaturation and a functional group reactive with hydrazine such as carboxylic acid groups, carboxylic acid anhydrides, ester groups and amide groups. In isolated instances, ethylenically unsaturated monomers containing acylchloride groups may be used but these are less desirable. Accordingly, monomers of the above type which may peferably be employed include ethylenically unsaturated esters, amides, carboxylic acids and carboxylic acid anhydrides.

Illustrative of a few of the monomers which contain both ethylenic unsaturation (i.e., polymerizable double bonds) and a functional group reactive with hydrazine which can suitably be employed in forming the addition polymer herein are alpha, beta-ethylenically unsaturated carboxylic acids such as acrylic acid, methacrylic acid, itaconic acid, crotonic acid, maleic acid and half esters of maleic acid and fumaric acids; ethylenically unsaturated esters such as alkyl acrylates and methacrylates having from 1 to 16 carbon atoms in the alkyl group, dimethyl maleate, dimethyl fumarate, diethyl fumarate and the like; unsaturated carboxylic acid amides such as acrylamide, methacrylamide, crotonamide, the mono- or diamide of itaconic or fumaric acid and the like; N-alkoxyalkyl-substituted amides such as N-(methoxymethyl)acrylamide, N-(propoxymethyl) acrylamide, N-(isopropoxymethyl)acrylamide, N-(butoxymethyl)acrylamide, N-(isobutoxymethyl)acrylamide, N-(butoxymethyl)methacrylamide and the like; and hydroxyalkyl esters of unsaturated acids in which the alkyl group contains up to 12 carbons such as hydroxyethyl acrylate, hydroxypropyl acrylate, hydroxybutyl acrylate, hydroxyethyl methacrylate, hydroxypropyl methacrylate, hydroxybutyl methacrylate, hydroxylauryl acrylate, hydroxylauryl methacrylate and the like.

For a more extensive list of monomers of the above type which may be employed in forming the acrylic polymer, reference may be made to U.S. Pat. No. 3,255,147 issued to Krueger et al, June 7, 1966, incorporated herein by reference.

Particularly preferred monomers containing polymerizable double bonds and functional groups reactive with hydrazine which may be employed include the alkyl acrylates and methacrylates having from 1 to 12 carbon atoms in the alkyl group such as methyl acrylate, ethyl acrylate, propyl acrylate, butyl acrylate, isobutyl acrylate, decyl acrylate, dodecyl acrylate, methyl methacrylate, ethyl methacrylate, propyl methacrylate, butyl methacrylate, lauryl methacrylate, decyl methacrylate and the like; and unsaturated carboxylic acids such as acrylic acid and methacrylic acid.

In addition to the above described monomers containing polymerizable double bonds and functional groups reactive with hydrazine, the acrylic polymer can contain (or be formed from) in part other ethylenically unsaturated monomers which do not contain such functional groups. Thus, it is advantageous and often preferred to include in the polymer, monomers such as the monoolefinic and diolefinic hydrocarbons. Suitable monomers of this type which may advantageously be utilized include, for example, styrene, alpha-methylstyrene, alpha-butylstyrene, 1,3-butadiene, isoprene, vinyl toluene and the like.

It should be noted at this time that the term "polymer" is meant to include homopolymers and copolymers and interpolymers prepared from one or more monomers.

The addition polymer is formed by polymerizing the desired monomers in the presence of a free radical vinyl polymerization catalyst. The preferred catalysts are azo compounds such as, for example, alpha, alpha'-azobis-(isobutyronitrile); peroxides such as benzoyl peroxide and cumene hydroperoxide; and tertiary butyl perbenzoate and tertiary butyl peracetate. Other useful catalysts include tertiary-butyl peroxy pivalate, isopropyl percarbonate, butyl isoperoxypropyl carbonate and similar compounds. The quantity of catalyst employed can be varied considerably, however, in most instances it is desirable to utilize from about 0.1 to 3.0 percent based on the weight of monomer solids.

Preferably, the molecular weight of the addition polymer used in the practice of the invention is at least 3,000 and more preferably between 5,000 and 300,000 on a weight average basis. Polymers with molecular weights above 300,000 have very high viscosities for coating applications and must be diluted to very low solids content to be usable. Addition polymers as used in the practice of the invention with molecular weights below 5,000 are very difficult to prepare.

If polymers of relatively low molecular weight are desired (for example, below 40,000) so that they can be dissolved at high solids and low viscosities, a chain modifying agent or chain transfer agent is ordinarily added to the polymerization mixture. The mercaptans, such as dodecyl mercaptan, tertiary dodecyl mercaptan, octyl mercaptan, hexyl mercaptan, isooctyl thioglycolate, and the like, are conventionally used for this purpose as can other chain transfer agents or "short-stopping" agents such as cyclopentadiene, allyl acetate, ally carbamate, alphamethylstyrene, alpha-methyl styrene dimers and the like.

The polymerization reaction can be carried out in an organic solvent medium utilizing conventional processes of polymerization which are well known in the addition polymer art as illustrated with particularity in, for example, U.S. Pat. Nos. 2,978,437; 3,079,434; and 3,307,963. In many cases, conventional organic solvent solution media such as those described in the aforementioned patents can be employed. However, in selecting appropriate solvents for the polymerization reaction, care must be taken to insure that the solvent selected is not reactive with hydrazine or the hydrazide modified acrylic polymer product. For that reason, ketonic solvents such as methyl ethyl ketone, methyl isobutyl ketone and the like and ester type solvents such as butyl acetate, Cellosolve acetate and the like should be avoided. In most instances, conventional hydrocarbon solvents such as toluene and xylene may be employed in the polymerization reaction.

In the event that it is desired to produce an ultimate resin product which can be dissolved in or reduced with water to form a water-based or water-containing coating composition, it is most desirable and preferred to employ water-soluble or miscible organic solvents in the polymerization reaction. Preferred organic solvents of this type include the lower alkanols (i.e., alkanols having 1 to 4 carbon atoms) such as methanol, ethanol, propanol, isopropanol, butanol and the like and the ether type alcohols such as ethylene glycol monoethyl ether, ethylene glycol monobutyl ether, diethylene glycol monoethyl ether, propylene glycol monobutyl ether and dipropylene glycol methyl ether.

As indicated previously, the addition polymer product containing hydrazide groups is prepared by reacting hydrazine with an addition polymer containing a functional group (i.e., carboxyl, anhydride, ester or amide) which is reactive with hydrazine.

The hydrazine employed in the reaction with the addition polymer is preferably anhydrous hydrazine or one of the hydrazine hydrates which are commercially available. The alkyl substituted hydrazines such as 1,1-dimethyl hydrazine, 1,2-diethyl hydrazine and the like can also be used in this reaction.

The amount of hydrazine reacted with the addition polymer is not critical as long as the number of moles of hydrazine used does not exceed the moles of ester (together with other reactive functionality such as amide groups, etc.) contained in the polymer. Thus, the amount of hydrazine utilized may range from as low as 1 mole percent to as high as 90 mole percent. However, in most cases, it is preferred to have from about 5 to about 40 mole percent of hydrazide in the final product.

Mole percent of hydrazide is defined as:

$$100 \times \frac{\text{Moles hydrazine reacted with addition polymer}}{\text{Total moles of monomers contained in polymer}} = \text{Mole \% hydrazide}$$

The reaction conditions for the reaction of hydrazine with the addition polymer may be quite varied. Hydrazine can be reacted with addition polymers at temperatures as low as 50° C., but at this temperature the reaction is usually very slow. The preferred temperatures for the reaction of the addition polymer with hydrazine is from 100° C. to about 160° C. However, the upper limit of the temperature may vary from polymer to polymer depending on the polymer's specific reactivity with hydrazine and/or reaction intermediates or products (i.e., hydrazide) formed in the reaction mixture. At the higher temperatures, especially higher than about 140° C., dihydrazide formation and other side reactions can take place which can lead to premature gelation of the polymer. Polymers high in acrylate, such as ethyl acrylate, are more reactive in this regard than methacrylate polymers, such as methyl methacrylate. The reaction can be conducted at atmospheric pressure or at higher pressures, e.g., from 1 to 20 atmospheres. Higher pressures are sometimes desirable because they allow the use of high temperatures to force the reaction of hydrazine to hydrazide in the presence of low boiling solvents.

The time required for the reaction is, of course, directly dependent on the temperature at which the reaction between hydrazine and the addition polymer is carried out. Polymer reactivity is another factor which influences reaction time. However, in most cases reaction times of from 3 to 20 hours are sufficient.

Preferably, the reaction medium for hydrazide formation is substantially free of added water, since water has been found to retard hydrazide formation. However, water in the form of the hydrate of hydrazine does not adversely affect the reaction. Also, water can be mixed with the acrylic polymer after hydrazide formation.

Reaction conditions such as described above generally result in at least 50 and usually at least 75 percent by weight of the hydrazine being converted to hydrazide; the percentage by weight being based on total moles of hydrazine or alkyl substituted hydrazine.

Since residual free hydrazine in the polymer may be undesirable (i.e., hydrazine is quite toxic), the reaction conditions described for the reaction of hydrazine with the addition polymer are most preferably designed to react nearly all of the hydrazine in the reaction mixture with the polymer. Finished polymers generally contain less than one percent free hydrazine and/or hydrazonium carboxylate.

As mentioned above and as will be discussed in more detail below, the polymeric compositions of this invention may be prepared in such a manner that the liquid medium of the solution or dispersion consists entirely of organic solvents or entirely of water or mixtures of organic solvents and water. In the event that it is desired to prepare a polymeric composition in which the liquid medium contains water, the addition polymer herein can be prepared so that it contains carboxylic acid functionality for purposes of water solubilization. As is well known, acid-containing polymers can be rendered water soluble or reducible through the formation of their salts by neutralization of all or a portion of the acid functionality with an appropriate basic compound. Preferred acids which may be included in the addition polymer herein for that purpose are acrylic acid or methacrylic acid, but any of the other unsaturated carboxylic acids referred to above may also be utilized.

Although carboxylic acids do react with hydrazine to some extent to form hydrazides, this is usually a difficult reaction to force to high yield. Therefore, hydrazide polymers can be made which contain residual carboxyl groups.

When it is desired to include acid functionality in the addition polymer for solubilization purposes, the addition polymer may contain (or be formed from) about 3 percent to about 20 percent by weight of such unsaturated carboxylic acids with the preferred amount being from about 5 percent to about 10 percent by weight.

As indicated above, the salt of the acid-containing polymer is prepared in known manner by reacting a suitable base or basic compound with the acid groups of the polymer to thereby neutralize or partially neutralize the acid groups. Various basic compounds may be utilized for that purpose including inorganic bases such as alkali metal hydroxides (e.g., potassium hydroxide) and organic bases such as amines. However, the preferred basic compounds utilized herein are the tertiary amines such as dimethylethanolamine, diethylethanolamine, triethylamine and the like. In addition, other monomeric amines such as, for example, ammonia, ethylamine, butylamine, dimethylamine, cyclohexylamine, morpholine, monoethanolamine, and the like may be employed in some instances.

The amount of base employed in neutralizing the acid groups of the polymer to form the salt or partial salt thereof may vary considerably. However, it is preferred in this invention that the amount of base employed be sufficient to neutralize at least about 25 percent of the theoretical quantity of acid groups present in the interpolymer.

When using a carboxylic acid-containing addition polymer, it is preferred that the polymer be in the salt form when it is reacted with hydrazine. An unneutralized polymer reacted with hydrazine may use up some of the hydrazine as the hydrazinium salts and thereby inhibit conversion of hydrazine to hydrazide. The hydrazine salt is in equilibria with free hydrazine and the carboxylic acid and will, of course, result in some toxic, unreacted hydrazine being present.

The formation of the polymer salt and reaction with hydrazine can be conducted as a two-step or a one-step process. In the two-step process, the acid-containing polymer and a basic compound are first mixed together and reacted to form the salt or partial salt of the polymer and subsequently the hydrazine is added. Alternatively, in the one-step process, the acid-containing resin, basic compound and hydrazine are admixed together and then reacted. It should be noted, however, that in the single step process, the speed of reaction between the basic compound and the acid groups of the polymer is so much greater (i.e., proceeds at room temperature) than the speed of reaction between hydrazine and the hydrazine reactive functional group (i.e., requires elevated temperature) that the salt or partial salt of the polymer forms before the reaction between hydrazine and the reactive functional group commences.

The following examples are submitted for the purpose of further illustrating the nature of the present invention and should not be construed as a limitation upon the scope thereof. Unless otherwise indicated, all parts and percentages in the examples are by weight.

The following examples (i.e., A through E) illustrate the preparation of amine salts of acrylic interpolymers employed in forming the acrylic-hydrazide resins of this invention.

EXAMPLE A

Into a 5 liter flask equipped with a stirrer, thermometer, nitrogen inlet, dropping funnel and a condenser fitted with a water trap was charged 800 grams of ethylene glycol monobutyl ether. The contents of the flask were heated to 130° C. and a solution consisting of 1,148 grams of methyl methacrylate, 320 grams of ethyl acrylate, 96 grams of methacrylic acid, 800 grams of ethylene glycol monobutyl ether and 48 grams of t-butyl perbenzoate was added dropwise to the flask over a 3-hour period while holding temperature at about 130° C. (Based on monomer solids, the monomer mixture consists of 74 percent methyl methacrylate, 20 percent ethyl acrylate and 6 percent methacrylic acid.) After the monomer addition was complete, 6.4 grams of t-butyl perbenzoate was added to the mixture. After 2 hours of heating at 130° C., another 6.4 grams of t-butyl perbenzoate was added. The mixture was then heated for an additional 2 hours at 130° C. Following this heating period, the methacrylic acid groups of the interpolymer were totally neutralized (i.e., 100 percent theoretical neutralization) with 99.8 grams of dimethylethanolamine. The product was then cooled.

The resultant amine interpolymer salt had the following properties:
150° C. solids content: 49.8 percent
Gardner-Holdt Viscosity: $Z_2$–$Z_3$
Acid Value: 23

EXAMPLE B

In this example, an amine-interpolymer salt was prepared utilizing essentially the same procedure as in Example A except that ethylene glycol monoethyl ether was employed in place of ethylene glycol monobutyl ether; three percent of tertiary dodecyl mercaptan was employed in the monomer mixture; and the monomer mixture consisted of 94 percent ethyl acrylate and 6 percent methacrylic acid.

The resultant amine-interpolymer salt had the following properties:
150° C. solids content: 46.8 percent
Gardner-Holdt Viscosity: A
Acid Value: 17.6

EXAMPLE C

In this example, an amine-interpolymer salt was prepared utilizing essentially the same procedure as in Example A except that ethylene glycol monoethyl ether was employed in place of ethylene glycol monobutyl ether; three percent of tertiary dodecyl mercaptan was employed in the monomer mixture; and the monomer mixture consisted of 65 percent methyl methacrylate, 20 percent ethyl acrylate and 15 percent methacrylic acid.

The resultant amine-interpolymer salt had the following properties:
150° C. solids content: 49.1 percent
Gardner-Holdt viscosity: X-Y
Acid Value: 46.1

EXAMPLE D

In this example, an amine-interpolymer salt was prepared utilizing essentially the same procedure as in Example A except that the monomer charged consisted of 64 percent methyl methacrylate, 20 percent ethyl acrylate, 10 percent acrylamide, and 6 percent methacrylic acid.

The resultant amine-interpolymer salt had the following properties:
150° C. solids content: 49.3 percent
Gardner-Holdt Viscosity: X-Y
Acid Value: 21

EXAMPLE E

In this example, an amine-interpolymer salt was prepared utilizing essentially the same procedure as in Example A except that 3 percent tertiary dodecyl mercaptan was included in the monomer mixture and the monomer mixture consisted of 74 percent methyl methacrylate, 20 percent hydroxyethyl acrylate and 6 percent methacrylic acid.

The resultant amine-interpolymer salt had the following properties:
150° C. solids content: 47.6 percent
Gardner-Holdt viscosity: Z
Acid Value: 27

The following Examples (1–3) illustrate the preparation of water-soluble or reducible acrylic-hydrazide resins of the invention utilizing certain of the acrylic-interpolymer salts of the preceding examples.

EXAMPLE 1

To the acrylic interpolymer salt solution of Example A (1600 grams of acrylic interpolymer solids) was added 250.2 grams of hydrazine monohydrate (64 percent $N_2H_4$) and the solution was refluxed for a period of 4 hours. During this time period, the reflux temperature dropped from 120° C. to 108° C. The temperature of the reaction mixture was next increased to about 160° C. by removing the low boiling volatiles through the water trap. Distillation was terminated when the reaction mixture reached 160° C. and refluxing continued for one hour at which time the reflux temperature dropped to 143° C. Again distillate was taken off until the temperature of the reaction mixture was 160° C. The temperature of the reaction mixture was thus maintained at about 160° C. for a total of 6 hours. A total of 755 grams of distillate was removed from the reaction mixture during the process. During the 6-hour time period, 300 grams of ethylene glycol monobutyl ether were added to the reaction mixture to control the viscosity. At the end of the 6-hour period of refluxing at about 160° C., the reaction mixture was cooled and 400 grams of deionized water was added to the flask.

The resultant acrylic-hydrazide resin product had the following properties:
150° C. solids content: 44.9 percent
Gardner-Holdt Viscosity: Z-5
Acid Value: 5.7
Gardner Color: 4

EXAMPLE 2

To the acrylic interpolymer salt solution of Example B (1500 grams of acrylic interpolymer solids) was added 375.3 grams of hydrazine monohydrate (64 percent $N_2H_4$). The mixture was heated to reflux and maintained at reflux for 12.5 hours. During this time period, the reflux temperature dropped from 112° C. to 100° C. The reaction mixture was cooled after this reflux period and 400 grams of deionized water were added to the product.

The resultant acrylic-hydrazide resin product had the following properties:
150° C. solids content: 33.4 percent
Gardner-Holdt Viscosity: V+
Acid Value: 9.7
Gardner Color: 3–4

EXAMPLE 3

To an autoclave (pressure reactor) was charged 1200 grams of an acrylic interpolymer salt solution such as that of Example E and 102 grams of hydrazine hydrate (64 percent $N_2H_4$). The autoclave was heated to 300°–310° F. (149°–154° C.) and held at this temperature for 6 hours. A peak gauge pressure of 74 psi at 310° F. (154° C.) was attained in the autoclave. After the 6-hour reaction period, the autoclave was cooled and the resin product removed.

The resultant acrylic-hydrazine resin product had the following properties:
150° C. solids content: 42.5 percent
Gardner-Holdt Viscosity: Z
Acid Value: 7.3
Gardner Color: 5

As illustrated by the above examples, water-soluble or reducible acrylic-hydrazide resins can be conveniently produced by reacting the amine salt of an acrylic interpolymer with hydrazine.

Water-soluble or reducible acrylic-hydrazine resins such as those exemplified in Examples 1–3 have utility in various coating applications. Thus, resins such as those of Examples 1–3 when thinned in known manner to proper application viscosity, applied to various substrates (e.g., glass, metal, etc.) in appropriate thickness (e.g., 3 mil) and baked (e.g., 30 minutes at 200° F. (93° C.)) produce smooth, continuous films having good solvent resistance.

While specific embodiments of the invention have been exemplified in the examples, it will be recognized by those skilled in the art that numerous variations can be made without departing from the scope of the invention.

We claim:

1. An acrylic polymer containing hydrazide groups comprising the reaction product of:
   (A) an addition polymer which does not contain an epoxy, nitrile or N-methylol group, formed by vinyl polymerization of 1 to 20 percent by weight of an alpha, beta-ethylenically unsaturated carboxylic acid and 80 to 99 percent by weight of at least one other vinyl monomer component at least a portion of which contains a functional group which is reactive with hydrazine to form hydrazide groups; the percentage by weight being based on total weight of alpha, beta-ethylenically unsaturated carboxylic acid and other vinyl monomer component, said addition polymer having at least 25 percent of its acid groups neutralized with an organic or inorganic base, said addition polymer being a solid in the absence of solvents,
   (B) 5 to 40 mole percent of hydrazine or an alkyl substituted hydrazine based on total moles of monomers used in preparing said addition polymer with the proviso that the moles of hydrazine or alkyl substituted hydrazine do not exceed the moles of monomers containing functional groups reactive with the hydrazine.

2. The acrylic polymer of claim 1 in which the carboxylic acid groups in the acrylic polymer are neutralized with an amine.

3. The acrylic polymer of claim 1 in which the alpha, beta-ethylenically unsaturated carboxylic acid is acrylic acid or methacrylic acid.

4. The acrylic polymer of claim 1 in which the functional group is an ester group, a carboxylic acid group, an anhydride group or an amide group.

5. The acrylic polymer of claim 1 wherein said monomer is an alkyl acrylate or methacrylate containing from 1 to 12 carbon atoms in the alkyl group.

6. The acrylic polymer of claim 5 wherein said vinyl monomer component contains a hydroxyalkyl ester of acrylic or methacrylic acid in which the alkyl group contains from 2 to 12 carbon atoms.

7. The acrylic polymer of claim 6 in which the hydroxyalkyl ester is hydroxyethyl acrylate or methacrylate.

8. The acrylic polymer of claim 1 wherein said vinyl monomer component contains an unsaturated carboxylic acid amide.

9. The acrylic polymer of claim 8 wherein said monomer is acrylamide or methacrylamide.

10. The acrylic polymer of claim 1 wherein said vinyl monomer component contains an N-alkoxy substituted amide.

11. The acrylic polymer of claim 10 wherein said vinyl monomer component contains N-(butoxymethyl)acrylamide or N-(butoxymethyl)methacrylamide.

12. The acrylic polymer of claim 1 wherein said vinyl monomer component contains a monoolefinic or diolefinic hydrocarbon.

13. The acrylic polymer of claim 12 wherein said vinyl monomer component contains styrene or vinyl toluene.

14. The acrylic polymer of claim 1 wherein said hydrazine is anhydrous hydrazine or hydrazine hydrate.

* * * * *